US007018682B1

(12) United States Patent
Rettig et al.

(10) Patent No.: US 7,018,682 B1
(45) Date of Patent: Mar. 28, 2006

(54) METHOD FOR REFINISHING DEFECTS IN STOVED ENAMELS WITH POWDER COATINGS

(75) Inventors: Armin Rettig, Saarbrücken (DE); Olaf Thiele, Baar Ebenhausen (DE)

(73) Assignee: E. I. duPont de Nemours and Company, Wilmington, DE (US)

( * ) Notice: Subject to any disclaimer, the term of this patent is extended or adjusted under 35 U.S.C. 154(b) by 39 days.

(21) Appl. No.: 10/018,896

(22) PCT Filed: Jun. 5, 2000

(86) PCT No.: PCT/EP00/05092

§ 371 (c)(1),
(2), (4) Date: Dec. 14, 2001

(87) PCT Pub. No.: WO00/76678

PCT Pub. Date: Dec. 21, 2000

(30) Foreign Application Priority Data

Jun. 14, 1999 (DE) ................................ 199 27 041

(51) Int. Cl.
*B05D 1/12* (2006.01)
*B05D 3/06* (2006.01)
*B32B 35/00* (2006.01)

(52) U.S. Cl. ...................... 427/510; 427/514; 427/521; 427/140; 427/142; 427/195; 427/485

(58) Field of Classification Search ................ 427/140, 427/142, 532, 553, 256, 287, 372.2, 384, 427/466, 468, 469, 486, 475, 195, 554–557, 427/510, 514, 521
See application file for complete search history.

(56) References Cited

U.S. PATENT DOCUMENTS

| | | | | | |
|---|---|---|---|---|---|
| 4,960,611 | A | * | 10/1990 | Fujisawa et al. | 427/504 |
| 5,585,146 | A | * | 12/1996 | Uenaka et al. | 427/407.1 |
| 5,852,067 | A | * | 12/1998 | Sukejima et al. | 522/53 |
| 5,932,282 | A | * | 8/1999 | Diener et al. | 427/140 |
| 5,997,941 | A | * | 12/1999 | Dannenhauer et al. | 427/140 |
| 6,162,861 | A | * | 12/2000 | Kawamoto et al. | 524/517 |
| 6,531,189 | B1 | * | 3/2003 | Blatter et al. | 427/514 |

FOREIGN PATENT DOCUMENTS

| | | | |
|---|---|---|---|
| DE | 3833225 | | 4/1989 |
| DE | 19720894 | | 11/1997 |
| DE | 19720945 | A | 11/1997 |
| DE | 19720946 | A | 11/1997 |
| EP | 0445556 | A | 9/1991 |
| EP | 0842710 | | 5/1998 |
| EP | 0887118 | A | 12/1998 |
| GB | 2008976 | A | 6/1979 |
| GB | 2305376 | A | 4/1997 |

OTHER PUBLICATIONS

"Sekundenschnelle Aushartung Von Pulverlack" [Curing Powder Coatings in Seconds], Kai Bar, Jot Feb. 1998, pp. 26-29 (Abstract).

* cited by examiner

*Primary Examiner*—Fred J. Parker
(74) *Attorney, Agent, or Firm*—Chyrrea J. Sebree; Steven C. Benjamin

(57) ABSTRACT

Method of repairing defective areas in a stoving lacquer coating, in which the defective area ready for repair lacquering is coated with a powder coating composition or with an aqueous powder coating slurry, and the applied powder coating is then melted and cured by irradiation with near infrared radiation (NIR).

19 Claims, No Drawings

METHOD FOR REFINISHING DEFECTS IN STOVED ENAMELS WITH POWDER COATINGS

BACKGROUND OF THE INVENTION

The invention relates to the repair lacquering of defects within stoved coating layers using powder coating compositions.

Lacquer defects, such as, for example, craters, dents, scratches or inclusions of dirt, within stoving coating layers, for example within stoved coating layers produced from powder coatings, can be repaired using liquid lacquers. The repair process is costly in terms of time and is labour-intensive. For example, curing of the repair lacquer requires the action of elevated temperatures for a sufficiently long period of time. If the substrates to be repair lacquered are temperature-sensitive substrates, then the object temperature cannot be chosen as high as desired. In the case of substrates to be repair lacquered that are composed of a mixture of temperature-sensitive and non-temperature-sensitive components, the temperature-sensitive components are generally removed prior to the action of heat, for example in a stoving oven, and are subsequently re-fitted. Such measures hinder series lacquering processes in particular, for example the lacquering of motor vehicles with filler, finishing or clear lacquers, and render them more expensive.

A particular problem in the repair lacquering, using liquid lacquers, of external, visible stoving finishing lacquers produced from powder coatings is that of carrying out the repair lacquering in such a manner that the repaired area is not visually conspicuous, for example in respect of colour matching or gloss. In addition, in the case of the repair of stoved clear powder coating layers, the refractive index of the cured clear repair lacquer must not differ substantially from the refractive index of the stoved clear powder coating.

Methods of repairing defective areas in lacquer layers while avoiding conventional thermal curing by convection or conventional IR irradiation are known from DE-A-38 33 225 and DE-A-197 20 894. The methods described therein use laser light as the energy source for curing of the repair lacquer. DE-A-197 20 946 describes a method for repairing defective areas in a stoving lacquer coating, wherein the defective area ready for repair is coated with a lacquer coating composition and the applied lacquer is then cured by irradiation with a laser beam source in the form of a Nd:YAG laser, which produces near infrared radiation.

From EP-A-0 842 710 there is known a method of repairing defective areas in powder coating layers in which a filling body is introduced into the defective area which has been prepared for repair, for example ground or milled out, and is bonded therewith. The filling body preferably corresponds to the dimensions of the prepared defective area. EP-A-0 887 118 improves the method known from EP-A-0 842 710 in respect of the achievable quality of the repaired defective area, by carrying out the method known from EP-A-0 842 710 in such a manner that the bonding of the filling body and the defective area takes place under the action of pressure. Although the methods of EP-A-0 842 710 and EP-A-0 887 118 avoid the disadvantages of repairing defective areas in powder coating layers by means of liquid lacquers, they are nevertheless complex because of the necessary preparation of the filling body, especially in the dimensions adapted to the defective area to be repaired.

In the article “Sekundenschnelle Aushärtung von Pulverlack” [Curing powder coatings in seconds] (Kai Bär, JOT 2/98, pages 26 to 29), it is described that powder coatings can be cured with the aid of high-intensity near infrared radiation (NIR) without any substantial heating of the substrate occurring. NIR technology allows powder coatings to be melted and cured in a single process step.

The object of the invention is to provide an improved method for the repair lacquering of defective areas in stoving lacquer coatings, especially within stoving lacquer coatings produced using powder coatings, which method avoids the described disadvantages of the prior art. The method should in particular also be suitable for the repair lacquering of series-lacquered, industrially manufactured articles, especially motor vehicles and parts thereof, for example within the framework of or subsequent to series lacquering.

SUMMARY OF THE INVENTION

The invention accordingly provides a method of repairing defective areas in a stoving lacquer coating, which method is characterized in that the defective area ready for repair lacquering is coated with a powder coating composition, and the applied powder coating is then melted and cured by irradiation with near infrared radiation (NIR), which is produced by NIR radiators.

DETAILED DESCRIPTION OF THE INVENTION

In the method according to the invention, the defective areas, of which there may be one or more, within a stoving lacquer coating, especially within a stoving lacquer coating applied from a powder coating composition, are repair lacquered using a powder coating composition. The stoving lacquer coatings having defective areas may be, for example, single-layer finishing lacquer coatings or lacquer layers arranged within a multilayer lacquer coating, for example primer coats, sufacer layers and, preferably, external, visible colour- and/or effect-giving or, especially, transparent finishing lacquer layers. The method according to the invention can be used preferably in the repair of defective areas within stoved coating layers produced from powder coatings, especially clear powder coatings. The method according to the invention can be used particularly preferably in the repair of defective areas within stoving lacquer coatings applied to motor vehicles and parts thereof.

The expression defective areas means that the defective areas in question within stoving lacquer coatings are limited locally, for example are up to several square centimeters in size, for example from 1 mm2 to 100 cm2 in size. The defective areas may be, for example, damage such as scratches, for example scratches caused during assembly, flaws in the coating, such as craters or dents, or inclusions of dirt.

It is pointed out that the powder coating compositions used for the repair lacquering include aqueous preparations of the powder coating compositions, so-called aqueous powder coating slurries. However, powder coatings themselves are preferably used in the method according to the invention.

The powder coatings used as repair lacquers in the method according to the invention contain a heat-curable binder system that is self-crosslinking or crosslinks by external means, preferably a binder/curing agent combination that crosslinks by external means. Binder is to be understood as meaning the film-forming higher molecular weight component of a thermosetting powder coating, which generally accounts for at least 50 wt. % of the underlying binder/curing agent combination, while the curing agent component in that combination is generally not more than 50 wt. %. The binder base is in principle not subject to any limitations. For example, conventional binders used for powder coatings are suitable. Examples are polyester resins, (meth)acrylic copolymers, epoxy resins, phenolic resins, polyurethane resins, siloxane resins. The binders have, for example, glass transition temperatures of from 30 to 120° C., preferably below 90° C., and have, for example, number-average molar masses (Mn) of from 500 to 20,000, preferably below 10,000. The curing agents have, for example, number-average molar masses (Mn) of from 84 to 3000, preferably below 2000. Different binders and curing agents can be mixed with one another.

Binders and curing agents carry mutually complementary reactive functional groups which permit a thermal crosslinking reaction of the powder coating, for example by condensation reactions and/or addition reactions. Examples of such functional groups are carboxyl groups, epoxy groups, aliphatically or aromatically bonded hydroxyl groups, isocyanate groups, blocked isocyanate groups, anhydride groups, primary or secondary amino groups, blocked amino groups, N-heterocyclic groups capable of ring-opening addition, such as, for example, oxazoline groups, (meth)acryloyl groups, CH-acidic groups such as, for example, acetoacetate groups.

The choice of groups that react with one another is known to the person skilled in the art. Different reactive groups can optionally be combined with one another. That can be effected via binders that carry different reactive functional groups, or mixtures of different curing agents and/or binders are used.

The different functional groups can be present both in the binder and/or the curing agent. The binders and the curing agents contain on average at least 2 functional groups per molecule. The ratio of binder to curing agent is generally, for example, from 98:2 to 50:50. It is preferably from 95:5 to 70:30.

Examples of binder/curing agent systems conventional in powder coatings are polyester resins with low molecular weight epoxy or hydroxyalkylamide curing agents, epoxy/polyester hybrid systems, epoxy resins with dicyanodiamide curing agents, carboxylic acid curing agents or phenolic curing agents, hydroxy-functional polyesters or (meth) acrylic copolymers with blocked polyisocyanates, epoxy-functional (meth)acrylic copolymers with carboxylic acid or carboxylic anhydride curing agents.

In particular in the case of the repair of defective areas in external, visible, stoved clear lacquer coatings, the repair lacquers used in the method according to the invention are preferably clear powder coatings that contain epoxy-functional (meth)acrylic copolymers, especially glycidyl(meth) acrylate copolymers having an epoxy equivalent weight of from 250 to 700, as binders, and one or more low molecular weight and/or polymeric compounds having on average 2 or more carboxyl functions per molecule, and/or anhydrides thereof, as curing agents. Preferred curing agents are solid aliphatic dicarboxylic acids and/or anhydrides thereof such as, especially, dodecanedicarboxylic acid, which may also be used in admixture with carboxyl-functional polyesters.

The powder coatings used in the method according to the invention can contain conventional powder coating additives in conventional amounts of, for example, from 0.1 to 5 wt. %. Examples of such additives are flow agents, degassing agents such as, for example, benzoin, antioxidants, light stabilisers, matting agents, colour- and/or effect-giving inorganic and/or organic pigments and/or fillers, colourants, adhesion promoters, lubricants, catalysts as well as rheology-controlling agents.

If opacifying pigments or effect pigments are used, then the powder coating compositions in question can be used for repairing defective areas in colour- and/or effect-giving lacquer layers. If no pigments or colourless pigments, for example micronised titanium dioxide or silicon dioxide, are used, then the clear powder coating compositions in question can be used for repairing defective areas in clear lacquer layers.

The preparation of the powder coatings used as the repair lacquer in the method according to the invention can take place according to the conventional methods for the preparation of powder coatings, for example by extrusion of the powder coating, ready formulated by dry mixing of all the necessary components, in the form of a pasty melt, cooling of the melt, coarse comminution, fine milling and, optionally, subsequent sieving to the desired fineness of grain, for example to mean particle sizes of from 10 to 90 μm.

The method according to the invention can be carried out using fine-grained powder coating, for example having mean particle sizes of from 1 to 40 μm. Fine-grained powder coating or powder coating fine grain can be prepared in a targeted manner, but it is obtained as undesired material during, for example, the production of powder coatings or during the application of powder coatings and can therefore usefully be employed in the method according to the invention.

The powder coatings can also be used in the form of aqueous powder coating slurry. To that end they can be converted, for example, by dry or wet milling or by intensive dispersion of a powder coating melt or an organic powder coating solution in water into an aqueous powder coating slurry, which can optionally be freed of organic solvent by distillation.

The powder coatings used in the method according to the invention preferably have the same solids composition as the lacquer previously used to produce the stoving lacquer layer having defective areas that is to be repaired. The repair in question is preferably the repair of defective areas in stoved powder coating layers. In that case, powder coatings having an identical composition are used both in the initial lacquering and in the repair lacquering according to the invention. That is particularly advantageous in the repair of defective areas in external, visible, stoved clear lacquer layers. For example, there is then no difference between the intrinsic colour and the refractive index of the initial lacquer coating and those of the repair lacquer coating.

In the method according to the invention, defective areas in a stoving lacquer coating are repaired using powder coatings as the repair lacquers. The defective areas may be ready for immediate repair lacquering, or they are prepared for the repair lacquering, for example by grinding, milling or treatment of the defective areas with a laser. In general, the defective areas are at least cleaned before the powdered repair lacquer is applied. It is also expedient to protect the defect-free coated portions of the surface from contamination, for example by covering them, masking them or by applying a removable lacquer around the defective areas to be repaired.

Regardless of whether the defective areas ready for the repair lacquering are located on horizontal or vertical surfaces, they can be coated with the powder coating composition, for example, mechanically, for example by sprinkling, brush application or application by painting, or application is effected by spraying using the application devices conventionally employed for that purpose. Mechanical application is suitable especially for fine-grained powder coating material. Spray application can be, for example, electrostatically assisted, for example with the aid of corona or tribo spray devices.

In the method according to the invention, after the powder coating has been applied or after the aqueous powder coating slurry has been applied and dried, the powder coating composition applied to the defective area is melted and cured by irradiation with NIR radiation, preferably with high-intensity NIR radiation.

NIR radiation is short-wave infrared radiation in the wavelength range from approximately 760 to approximately 1500 nm, preferably 760 to 1200 nm. According to the invention there are used conventional high-energy NIR radiators, which are able to emit radiation over an area or focused along a line or at a point. Such NIR radiators are available commercially (for example from Industrie SerVis). They are, for example, high-power halogen radiators with a radiation density of generally more than 1 $W/cm^2$, preferably more than 10 $W/cm^2$, to, for example, 15 $MW/m^2$. The radiators reach, for example, a radiator surface temperature (incandescent coil temperature) of from 2000 to 3000 K. Suitable radiators have, for example, an emission spectrum with a maximum between 750 and 1200 nm.

The irradiation time in the method according to the invention is, for example, from 1 to 300 seconds. During irradiation, the powder coating applied in order to repair the defective area melts and cures, for example, within from 1 to 300 seconds, preferably within from 5 to 60 seconds.

The irradiation can be carried out in a belt apparatus equipped with one or more NIR radiators, or using a NIR radiator, which is positioned in front of the object or the area to be irradiated.

The first-mentioned possibility is suitable, for example, in the repair lacquering of individual parts or of objects in which a plurality of defective areas is to be repaired in one step. The belt speed, and hence the irradiation time, can be varied. For example, belt speeds of from 1 to 7 m/minute can be set, which may correspond, for example, to irradiation times of from 2 to 20 seconds. The distance between the NIR radiator and the surface of the object can be, for example, from 1 to 60 cm, preferably from 4 to 20 cm.

In the case of the second possibility, the NIR radiator is positioned in front of the object or the area to be irradiated. The irradiation time can be, for example, from 1 to 300 seconds, and the distance to the object can be, for example, from 1 to 60 cm, preferably from 4 to 20 cm.

The various irradiation parameters, such as the belt speed or irradiation time, the distance from the object, the radiation capacity of the NIR radiator used, can be adapted by the person skilled in the art according to the requirements of the particular repair task in question.

It is also possible to use for the curing a combination of NIR irradiation and the supply of heat by means of conventional heat sources such as convection ovens or usual longer-wave infrared radiators.

After curing by NIR irradiation of the powder coating applied in order to repair defective areas, it may be expedient to smooth the repaired area, for example by polishing.

By means of the method according to the invention it is possible to repair defective areas in single-layer stoving lacquer coatings. It is also possible using the method according to the invention to repair defective areas in a stoving lacquer layer arranged within a multilayer lacquer coating. At least two cases can be distinguished:

1. Application of one or more lower (closer to the substrate) lacquer layers, optional drying or curing thereof, application according to the invention of repair powder coating (or aqueous repair powder coating slurry), melting and curing of the (dried) powder coating layer by NIR irradiation, optional covering with further coating layers. In the case, for example, of a defective area that is to be repaired within a clear lacquer layer of a colour- and/or effect-giving base lacquer-clear lacquer two-layer lacquer coating, first the colour- and/or effect-giving base lacquer layer can be applied from a base lacquer coating composition to the defective area of the stoving lacquer coating ready for repair lacquering, that layer can optionally be exposed to air and/or stoved, and then a clear powder coating can be applied and melted and cured by NIR irradiation.
2. Application according to the invention of repair powder coating (or repair powder coating slurry), melting and curing of the (dried) powder coating layer by NIR irradiation, optional covering with further coating layers. In the case, for example, of a defective area within a surfacer layer that is to be repaired, a powder surfacer is applied and melted and cured by NIR irradiation before, for example, being covered with base lacquer and clear lacquer. For example, covering with base lacquer and clear lacquer can take place within the framework of the initial lacquering or within the framework of a repair lacquering carried out on the finished initially lacquered object. Another example is a defective area that is to be repaired within a clear lacquer layer of a colour- and/or effect-giving base lacquer-clear lacquer two-layer lacquer coating. In that case, a clear powder coating can be applied to the defective area ready for repair, for example a defective area that has not been ground out to the base lacquer layer or even further, and melted and cured by NIR irradiation.

The method according to the invention permits the repair lacquering of defective areas in stoving lacquer coatings, especially within stoving lacquer coatings produced using powder coatings. The disadvantages of the prior art mentioned at the beginning can be avoided. The method is suitable for the repair lacquering of series-lacquered, industrially manufactured articles; it is suitable especially for the repair of defective areas within powder coating layers, especially finishing and clear powder coating layers, produced within the framework of the series lacquering of motor vehicles or motor vehicle parts.

EXAMPLE

On an engine bonnet having a typical series lacquering structure of cathodically deposited primer coat, surfacer layer, base lacquer layer and, finally, clear powder coating layer, there is a particle of dirt within the clear powder coating layer.

The particle of dirt is removed by grinding, without penetrating the base lacquer layer. A defective area approximately 0.5 cm2 in size and ready for repair is formed in the clear powder coating layer. The region to be repaired is isolated from the defect-free surface by masking with heat-stable film.

The same clear powder coating as that previously used to produce the initial lacquer coating is applied by electrostatic spraying to the defective area ready for repair.

A NIR radiator from Industrie SerVis is positioned at a distance of 100 mm from the defective area coated with the clear powder coating. Irradiation is carried out for 8 seconds with a capacity of 400 kW/m2, during which time the clear powder coating melts and cures completely.

The covering film is then removed and the small area of the repaired area is polished using a commercial grinding paste.

What is claimed is:

1. A method of repairing at least one defective area in at least one stoving lacquer coating comprising the steps of:

(a) applying a pulverulent powder coating directly to at least one defective area, wherein said powder coating has a mean particle size ranging from about 1 to about 90 μm and comprises a heat-curable binder system selected from the group consisting of a self-crosslinking system and an externally crosslinked system; and (b) melting and curing the applied powder coating by irradiation for 1 to 300 seconds with near infrared radiation in the wave length range from about 760 nm to about 1500 nm emitted by a high-energy near infrared radiation radiator having a radiation density of more than 1 W/cm$^2$ to 15 MW/m$^2$ and operated at a radiator surface temperature of 2000 to 3000 K. to form a repaired area.

2. The method according to claim 1, further comprising the step of (c) polishing the repaired area.

3. The method according to claim 1, wherein the at least one stoving lacquer coating is selected from the group consisting of a single-layer finishing lacquer coating and a lacquer layer within a multi-layer lacquer coating.

4. The method according to claim 3, wherein the at least one stoving lacquer coating is selected from the group consisting of an external finishing lacquer layer, a visible color finishing lacquer layer, an effect-giving lacquer layer, a transparent finishing lacquer layer and a visible color and effect-giving finishing lacquer layer.

5. The method according to claim 1, wherein the at least one stoving lacquer coating is produced from a powder coating.

6. The method according to claim 5, wherein the at least one stoving lacquer coating is produced from a clear powder coating.

7. The method according to claim 1, wherein the powder coating is a clear powder coating.

8. The method according to claim 7, wherein the clear powder coating comprises a binder selected from the group consisting of epoxy-functional (meth)acrylic copolymers having an epoxy equivalent weight of 250 to 700; and a curing agent selected from the group consisting of at least one low molecular weight compound having an average of at least two carboxyl functions per molecule, at least one polymeric compound having an average of at least two carboxyl functions per molecule, anhydrides and combinations thereof.

9. The method according to claim 8, wherein the curing agent is selected from the group consisting of solid aliphatic dicarboxylic acids, anhydrides thereof and combinations thereof.

10. The method according to claim 9, wherein the curing agent is dodecanedicarboxylic acid.

11. The method according to claim 1 wherein the heat-curable binder system is a binder/curing agent combination having at least two reactive functional groups.

12. The method according to claim 11, wherein the binder of the binder/curing agent combination is selected from the group consisting of polyester resins, (meth)acrylic copolymers, epoxy resins, phenolic resins, polyurethane resins, siloxane resins and combinations thereof.

13. The method according to claim 11, wherein the curing agent of the binder/curing agent combination has a number average molecular mass of 84 to 3000.

14. The method according to claim 11, wherein the at least two reactive functional groups are selected from the group consisting of carboxyl groups, epoxy groups, aliphatically bonded hydroxyl groups, aromatically bonded hydroxyl groups, isocyanate groups, blocked isocyanate groups, anhydride groups, primary amino groups, secondary amino groups, blocked amino groups, N-heterocyclic groups capable of ring-opening addition, and combinations thereof.

15. The method according to claim 11, wherein the binder/curing agent combination is in a ratio of 98:2 to 50:50.

16. The method according to claim 1, wherein the powder coating further comprises at least one additive selected from the group consisting of flow agents, degassing agents, antioxidants, light stabilizers, matting agents, color-giving inorganic pigments, color-giving organic pigments, effect-giving inorganic pigments, effect-giving organic pigments, fillers, colorants, adhesion promoters, lubricants, catalysts, rheology-controlling agents, and combinations thereof.

17. The method according to claim 1, wherein the mean particle size ranges from 1 to 40 μm.

18. The method according to claim 1, wherein the near infrared radiator emits radiation over an area or is focused along a line or point.

19. The method according to claim 1, wherein the near infrared radiation is used in combination with heat sources selected from the group consisting of convection ovens and long-wave infrared radiators.

* * * * *